United States Patent [19]

Heathcote

[11] Patent Number: 5,628,414

[45] Date of Patent: May 13, 1997

[54] VISUAL DISPLAY RACK APPARATUS

[76] Inventor: Donald I. Heathcote, 720 E. 750 North, Ogden, Utah 84404

[21] Appl. No.: 422,477

[22] Filed: Apr. 17, 1995

[51] Int. Cl.$^6$ ............................................. A47G 29/00
[52] U.S. Cl. ............................................. 211/40; 211/87
[58] Field of Search .................... 211/40, 41, 87, 211/88; 206/308.1, 387.1, 387.14, 387.15; D6/407, 629, 630, 310; 40/124, 152.1

[56] References Cited

U.S. PATENT DOCUMENTS

| | | | |
|---|---|---|---|
| 1,850,647 | 3/1932 | Whitcomb | 211/41 X |
| 3,367,509 | 2/1968 | Cabe | 211/87 |
| 3,647,074 | 3/1972 | Talmadge | 211/40 |
| 3,719,284 | 3/1973 | Rasmusson et al. | 211/41 X |
| 3,799,488 | 3/1974 | Sena | 248/126 X |
| 3,810,323 | 5/1974 | Lowe | 40/124 X |
| 4,462,498 | 7/1984 | Walker, Jr. | 211/40 |
| 4,684,030 | 8/1987 | Gurzynski | 211/40 X |
| 5,259,517 | 11/1993 | Pancoe | 211/41 |
| 5,341,942 | 8/1994 | James, Jr. | 211/40 |
| 5,372,263 | 12/1994 | Niekel | 211/41 |
| 5,497,889 | 3/1996 | Genovesi | 211/40 |

*Primary Examiner*—Alvin C. Chin-Shue
*Assistant Examiner*—Sandra Snapp
*Attorney, Agent, or Firm*—Foster & Foster

[57] ABSTRACT

A visual display rack apparatus includes a main support member, at least one lower support member, and at least one retention member. In a preferred embodiment, pairs of upper retention members and lower support members provide retaining spaces for holding containers adapted to store media on which music is recorded. One embodiment of the visual display rack apparatus is mountable to a portion of a upstanding wall. Another embodiment of the visual display rack apparatus allows it to stand alone on a substantially horizontal surface. The display rack apparatus can be made to hold all known types of music containers.

19 Claims, 2 Drawing Sheets

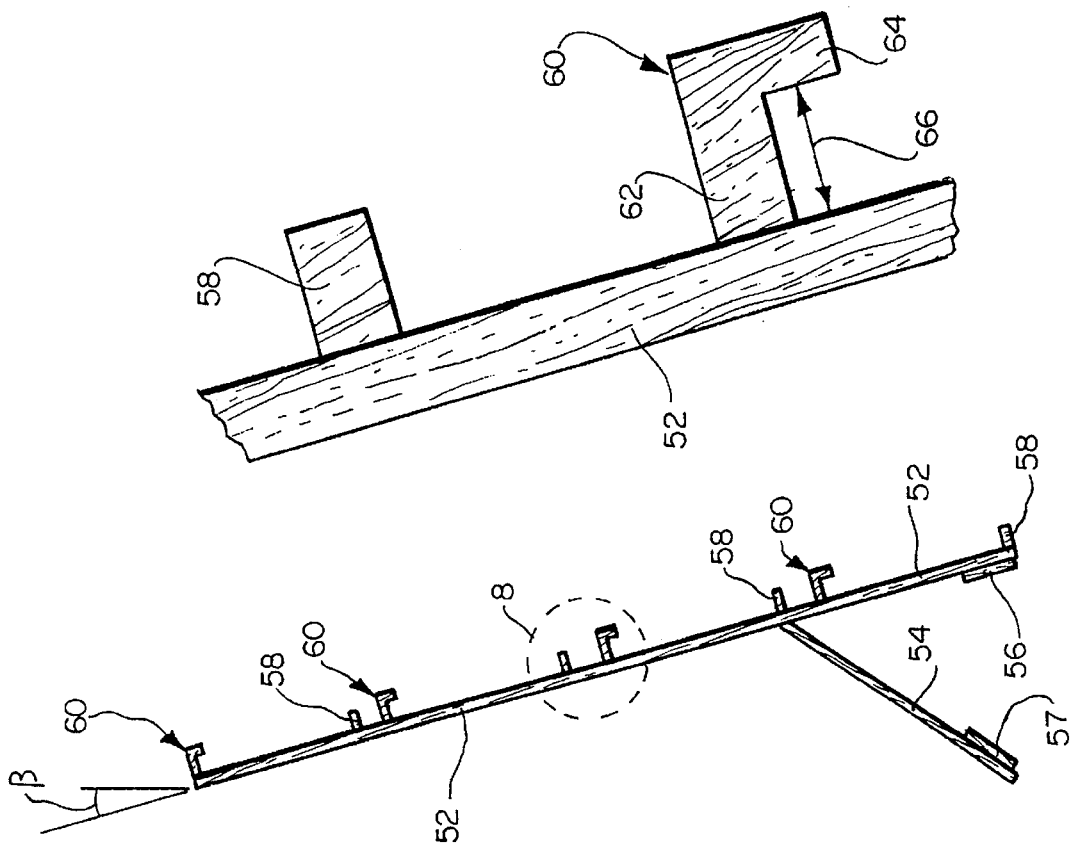
FIG. 5
FIG. 6
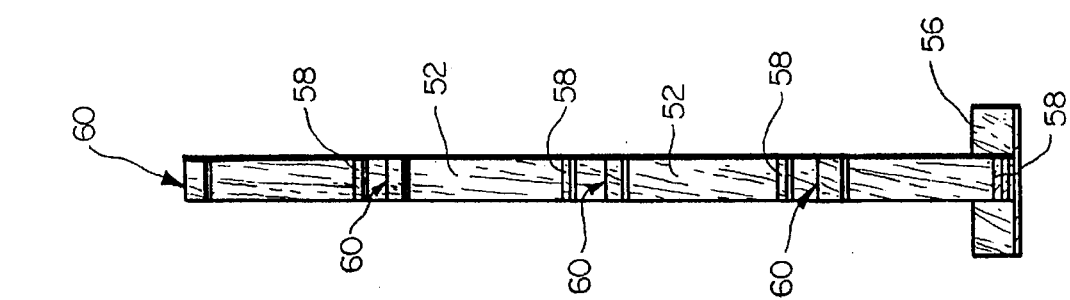
FIG. 7
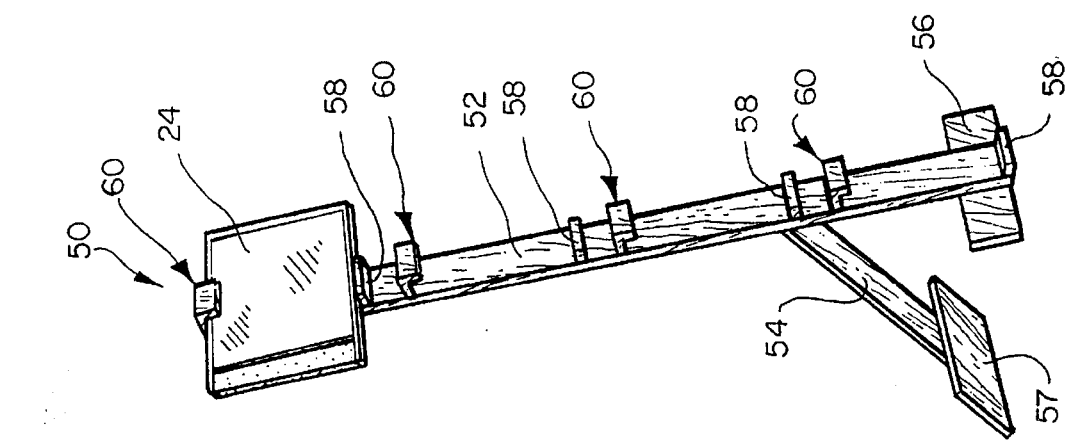
FIG. 8

VISUAL DISPLAY RACK APPARATUS

TECHNICAL FIELD

This invention relates to storage devices, and more particularly, to storage and display devices for displaying the from side of containers used to hold media on which music has been recorded.

BACKGROUND OF THE INVENTION

Many types of storage cases and storage racks have been developed for holding music containers adapted to protect and cover media (such as cassette tapes, compact disks, and the like) on which music has been recorded. Traditional storage devices for music containers are designed to store as many containers as possible in the smallest amount of space. Typically, such storage containers allow only an edge of the music container to be viewable when held within the storage container. Therefore, music containers have been developed to include an identifying edge which is visible when the container is held by the storage device.

Although traditional storage units for music containers provide space-efficient locations for storing such containers, there are several problems that have yet to be adequately addressed. On virtually all music-containing devices, a form of artwork is provided on a front cover portion of the a particular storage device. Such front cover portions typically involve the largest area on the container and therefore provide the best locations for such artwork. It is common for the listeners of a particular piece of music to develop, almost immediately, an association between the particular music and the artwork displayed on the front cover portion of the music container. Most music vendors appreciate this visual connection between the music and the artwork on the front cover portion. Music is commonly sold in bins with vertical dividers to hold a number of music containers. The music containers rest on their respective bottom edges and, as such, can be pivoted back and forth to view adjacently positioned music containers and the artwork displayed on the front covers.

The artwork on the front covers of music containers is often aesthetically pleasing to the purchaser. Not only does the purchaser buy the music held by the container, but the artwork displayed on the front side as well. Prior storage devices for music have failed to allow the listener of the music to display the artwork on the front cover. Not only have traditional storage devices failed to provide a way to display the cover portions, but they have in fact been designed to hide the front cover portions based on the very manner in which they are held by the storage device.

Still another problem with respect to traditional storage devices is that they do not provide an ability to display the artwork on the cover of the storage container corresponding to the music being played. Many compact disk players have carrousels that allow the listener to place multiple compact disks inside the carrousel for sequential listening. Traditional storage devices for music containers require the containers to be reinserted into slots which again cover the artwork associated with the music being played. Traditional storage devices have failed to provide the listener with an ability to display the artwork associated with the music being played at the time the music is being played.

In view of the foregoing, there is a need to develop a storage and display rack apparatus that allows the artwork associated with a music container to be displayed by the listener. There is a further need to develop a visual display apparatus that allows the music listener to display artwork associated with music containers in a room or area where the music is being played. There is a need to provide a visual display rack that allows presentation of the music container artwork on a wall so as to minimize vertical shelf storage space required for such music containers. Another need exists with respect to providing a display rack apparatus that allows the listener to display the particular artwork covers associated with the music being played in a stereo or other music-playing device.

SUMMARY AND OBJECTS OF THE INVENTION

It is an object of the invention to provide a display rack apparatus that allows a music listener to display the front cover artwork of a music container device.

Another object of the invention is to provide a display rack apparatus that can be mounted to a wall.

Another object of the invention is to provide a display rack apparatus that presents the cover artwork of a music container and is a stand-alone unit.

Still another object of the invention is to provide a display rack apparatus that holds multiple music containers so that the cover artwork can be viewed with respect to each such container.

Yet another object of the invention is to provide a display rack apparatus that is easy to use and holds the music container securely in place.

Another object of the invention is to provide a display rack apparatus that is readily and easily installed on any vertical wall.

The foregoing objects are achieved by a display rack apparatus that includes a main support member having a plurality of lower support shelves and a plurality of upper retention members. Music containers are held between each of the lower support shelves and the upper retention members. One embodiment of the display rack apparatus provides for quick and easy mounting to a wall. Another embodiment of the display rack apparatus is a stand alone unit which allows a number of music containers to be stored to present the front cover artwork.

Other objects, features, and advantages of the invention will become apparent from the following detailed description of the invention with reference to the accompanying drawings.

BRIEF DESCRIPTION OF THE DRAWINGS

Preferred embodiments of the invention are described below with reference to the accompanying drawings:

FIG. 5 is an isometric view of yet another alternative embodiment of a visual display rack apparatus according to the present invention;

FIG. 6 is a front view of the visual display rack apparatus of FIG. 5;

FIG. 7 is side elevation view of the visual display rack apparatus of FIG. 5; and FIG. 8 is an enlarged view of the area 8 shown in FIG. 7.

DETAILED DESCRIPTION OF THE INVENTION

Figure 1:
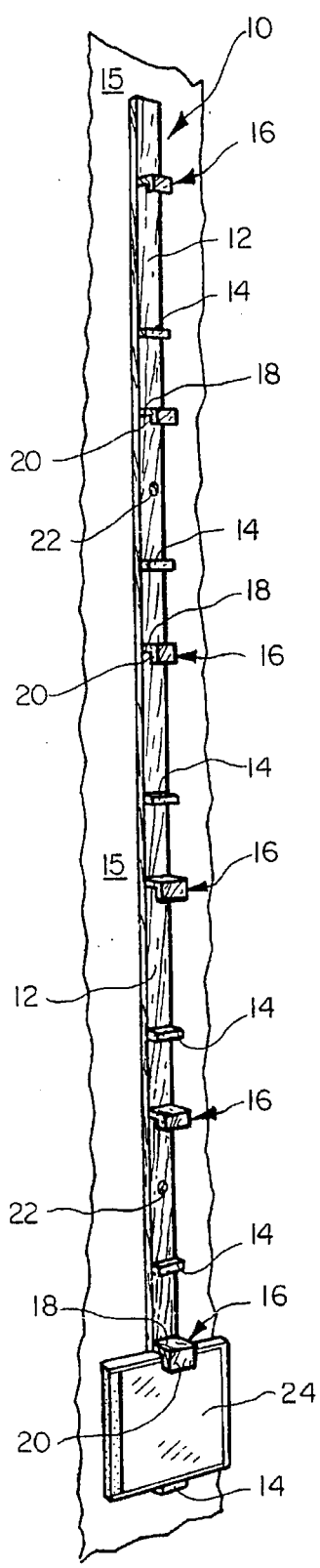
FIG. 1 is an isometric view of a visual display rack apparatus according to the present invention with the display rack apparatus being mounted to a wall.
Figure 2:
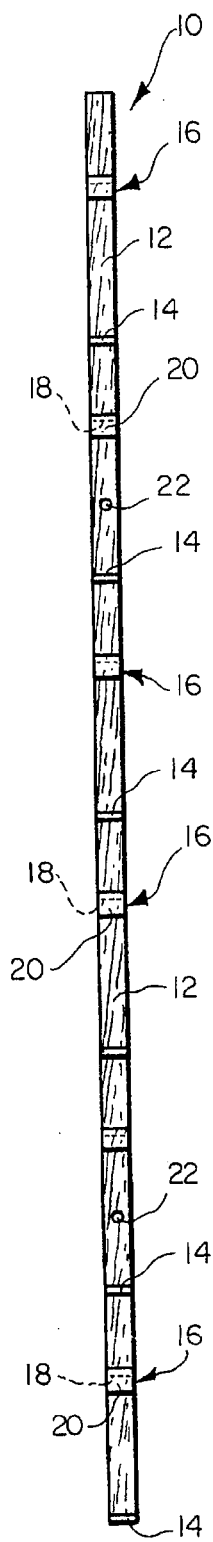
FIG. 2 is a front view of the visual display rack apparatus of FIG. 1 apart from a wall.
Figure 3:
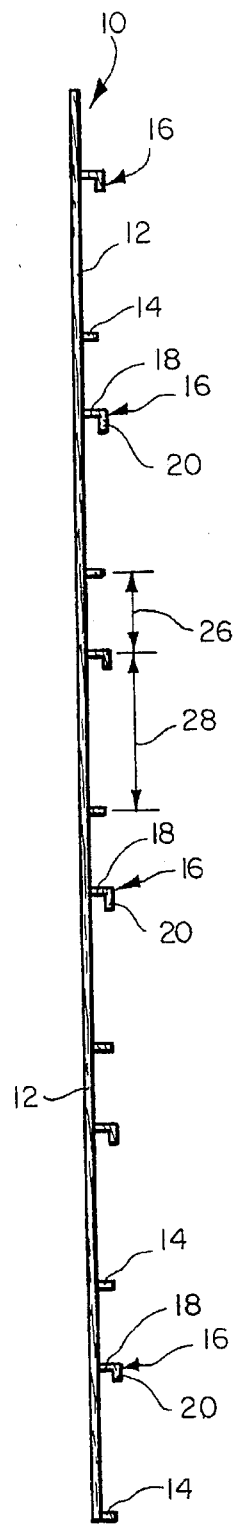
FIG. 3 is a side elevation view of the display rack apparatus of FIG. 2.

FIGS. 1–3 show a first embodiment of a visual display rack apparatus 10 according to the present invention. FIG. 1 shows the display rack apparatus 10 mounted to a wall 15. One beneficial aspect of the FIG. 1 embodiment of the present invention is that it is mountable to a wall so as to minimize horizontal shelf space required to store and display music containing devices.

The visual display rack apparatus 10 comprises generally a main support member 12 which has a length, a width, and an outwardly exposed surface. The main support member is long, thin, and narrow. In a preferred embodiment, the width of the main support member 12 is approximately 3.8 centimeters (1½ inches), and the thickness of the main support member is approximately 0.96 centimeters (⅜ of an inch).

A plurality of lower support segments or shelves 14 are attached to the main support member 12. The lower support shelves 14 extend perpendicularly outwardly from the main support member. In a preferred embodiment, the main support shelves extend approximately 1.3 centimeters (½ inch) from the outer surface of the main support shelf. The shelf portions 14 span substantially the width of the main support member.

A plurality of upper retention members 16, each corresponding to a particular lower support shelf 14, are also mounted to the main support member 12. The upper retention members comprise an outwardly extending flange portion 18 extending perpendicularly outwardly from the main support member 12. The upper retention member 16 further comprises a hook portion 20 extending downwardly from the flange portion 18. The hook portion extends downwardly approximately (⅛ inch) from the flange portion. As shown in FIG. 1, a container 24 for holding a medium (such as a compact disk, cassette tape, or other medium) on which music is recorded is positioned between a support shelf 14 and an upper retention member 16. Such a so-called music container is placed in the visual display rack apparatus 10 by first inserting an edge of the container 24 into the upper retention member 16, and thereafter articulating the container 24 until it engages substantially the entire length of the outer surface of the main support member 12 between the particular lower support member 14 and the upper retention member 16. Removal of the container 24 is accomplished by reversing this process.

FIGS. 1 and 2 show mounting locations 22 which allow the display rack apparatus to be mounted to a wall. Such mounting locations could be thin-walled portions (if the device is injection molded) or apertures (where the device is made of wood). Conventional fasteners may be used to mount the visual display rack apparatus 10 at the mounting locations 22.

FIG. 3 shows two spacing dimensions used in connection with the present invention. A first spacing dimension 26 defines the distance between the various music containers mounted on the visual display rack apparatus 10. This distance may be varied according to the desired spacing. Furthermore, it is within the scope of the present invention to remove the lower support shelves 14 and space the upper retention members 16 such that the upper surface of a retention member acts to support an upwardly adjacent music container, thus removing the need for the lower support members 14. This, of course, would minimize spacing between adjacent music containers, except for the thickness of the flange portions 18.

FIG. 3 also discloses relative spacing between a lower support shelf 14 and an upper retention member 16. This spacing 28 is substantially equal to a dimension of the container 24 such that a front cover portion of the container 24 is outwardly visible. Artwork associated with such music devices are typically displayed through a clear plastic surface of the container 24, therefore, as is custom in the industry, the dimension 28 corresponds to the proper presentation of such artwork.

Figure 4:
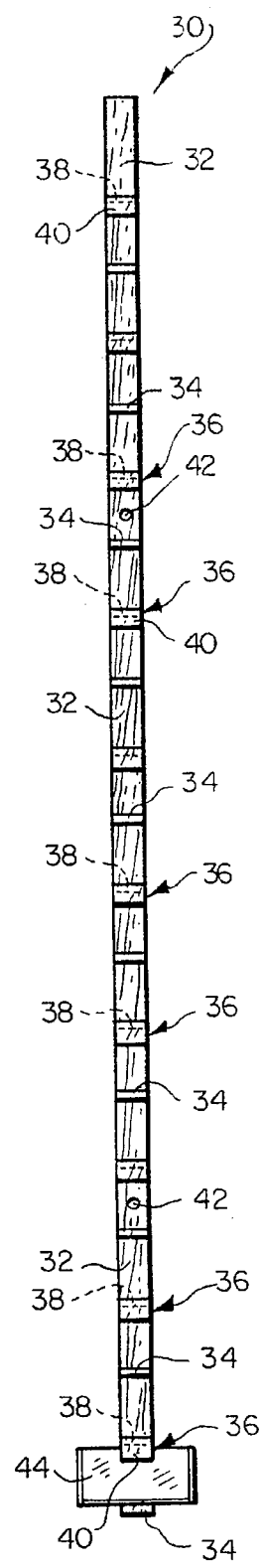
FIG. 4 is a front view of an alternative embodiment of a visual display rack apparatus according to the present invention.

FIG. 4 shows another alternate embodiment of the present invention. This embodiment shows a visual display rack apparatus 30 sized to hold a plurality of containers, specifically in the form of audio cassette containers 44. The display rack apparatus 30 comprises a main support member 32, a plurality of lower support members 34, and an upper retention member 36 including an outwardly extending flange portion 38 (shown in hidden lines) and a downwardly oriented hook portion 40. Mounting locations 42 are provided for mounting the display rack apparatus 30 a vertical wall. The structures shown in FIG. 4 are substantially the same as those shown in the embodiment of FIGS. 1–3, with the primary difference being the spacing between lower support member 34 and upper retention member 36. Such spacing corresponds in this embodiment to a container for an audio cassette.

FIGS. 5–8 show yet another alternative embodiment of the present invention. This embodiment shows a stand-alone visual display rack apparatus 50. This embodiment discloses a main support structure 52, a plurality of vertical support members 58 extending perpendicularly outwardly from the main support portion 52, and a plurality of upper retention member 60. These lower support members 58 and upper retention member 60 are substantially the same as those corresponding members 14, 16 shown in FIGS. 1–3, respectively. The embodiment of FIGS. 5–8 further include in upstanding support arm 54. This enables the display rack apparatus 50 to be inclined at an angle β relative to a vertical axis. This allows the unit to be a free-standing unit without requiring it to be secured to an upstanding wall. To enhance stability, a first stabilizer 56 is mounted in a transverse manner to the main support member 52. Likewise, a stabilizer 57 is transversely mounted relative to the support arm 54.

With reference to the enlarged view shown in FIG. 8, the distance 66 provided between the main support member 52 and the hook member portion 64 extending from flange portion 62 of the upper retention member 60 is shown. This distance 66 corresponds substantially to the thickness of the container 24 to be held by the display rack apparatus 50. It is to be understood that although a compact disk container 24 is shown in FIG. 5, the spacing of the lower support members 58 relative to the upper retention member 60 may vary according to the desired container or plurality of containers to be held. Such a display apparatus may provide spaces for various types of containers on a single display rack, such as spaces for a compact disk container and spaces for a cassette tape container.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications with the proper scope of the appended claims appropriately interpreted in accordance with the doctrine of equivalents.

I claim:

1. A visual display rack apparatus in combination with a music container for displaying a front side of said music container adapted to hold a medium on which music is recorded, comprising:

a music container;

said main support member having a length, a width, and a longitudinal axis, the length of the main support member extending along the longitudinal axis;

at least one lower support shelf extending outwardly from the main support member to engage and support a bottom edge of the music container;

at least one upper retention member extending from the main support member, the upper retention member holding a top end of the music container;

a retaining space formed between the lower support shelf and the upper retention member to create an interference fit of the music container between the lower support shelf and the upper retention member to hold the music container firmly in place.

2. A visual display rack apparatus according to claim 1 wherein the lower support shelf extends perpendicularly outwardly from a planar outer surface.

3. A visual display rack apparatus according to claim 1 wherein the upper retention member includes an outwardly extending flange portion that extends perpendicularly outwardly from the main support member.

4. A visual display rack apparatus according to claim 1 wherein the lower support shelf and the upper retention member extend perpendicularly outwardly from the main support member.

5. A visual display rack apparatus according to claim 1 wherein pairs of said upper retention members and said lower support shelves extend outwardly from the main support member to form a plurality of retaining spaces, each retaining space being dimensioned to hold the music container.

6. A visual display rack apparatus according to claim 1 wherein the upper retention member includes an outwardly extending flange portion and a retaining lip projecting generally downwardly from the outwardly extending flange portion.

7. A visual display rack apparatus according to claim 1 wherein the upper retention member is L-shaped and includes an outwardly extending flange portion and a retaining lip projecting downwardly from the outwardly extending flange portion.

8. A visual display rack apparatus according to claim 1 wherein the upper retention member is L-shaped and includes an outwardly extending flange portion and a retaining lip projecting downwardly from the flange portion, the retaining lip extending downwardly approximately ⅛ inch from the flange portion to hold the music container within the display rack apparatus.

9. A visual display rock apparatus according to claim 1 wherein the retaining space is dimensioned to hold a compact disk storage container.

10. A visual display rack apparatus according to claim 1 wherein the retaining space is dimensioned to hold a cassette tape storage container.

11. A visual display rack apparatus according to claim 1, further comprising a plurality of said lower support shelves and a plurality of said upper retention members extending in an alternating manner from the main support member, each adjacent upper retention member and lower support shelf defining a retaining space therebetween, the retaining space being substantially equal to an outer dimension of the music container such that a slight interference fit results upon inserting the music container between the support shelf and the upper retention member.

12. A visual display rack apparatus according to claim 1, further comprising a plurality of said lower support shelves and a plurality of said upper retention members extending in an alternating manner from the main support member in pairs to define a plurality of retaining spaces, each adjacent upper retention member and lower support shelf define one of the retaining spaces, each retaining space being substantially equal to an outer dimension of the music container such that a slight interference fit results upon inserting the music container within one of the retaining spaces.

13. A visual display rack apparatus according to claim 1, further comprising a plurality of apertures formed in the main support member for mounting the display rack apparatus to an upstanding wall.

14. A visual display rack apparatus according to claim 1, further comprising a support leg extending angularly downwardly from the main support member, the support leg allowing the display rack apparatus to stand alone on top of a generally horizontal surface.

15. A visual display rack apparatus according to claim 1, further comprising a support leg extending angularly downwardly from the main support member, the support leg allowing the display rack apparatus to stand alone on top of a generally horizontal surface, the main support member being oriented at an angle of inclination when the display rack apparatus is positioned to stand alone.

16. A visual display rack apparatus for displaying a from side of a music container adapted to hold a medium on which music is recorded, comprising:

a music container;

a main support member having a length, a width, and a longitudinal axis, the length of the main support member extending along the longitudinal axis;

a plurality of lower support shelves, each lower support shelf extending perpendicularly outwardly from the main support member to engage and support a bottom edge the music container;

a plurality of upper retention members, the upper retention member holding a top end of the music container substantially against the main support member;

a plurality of retaining spaces formed between the lower support shelf and the upper retention member to create an interference fit of the music container between the lower support shelf and the upper retention member to hold the music container firmly in place.

17. A visual display rack apparatus according to claim 16 wherein each upper retention member includes an outwardly extending flange portion and a hook portion projecting downwardly from the outwardly extending flange portion.

18. A method of placing a music container in a visual display rack comprising the steps of:

providing a visual display rack including a main support member, a lower support shelf coupled to the main support member and an upper retention member coupled to the main support member;

providing the music container having an upper edge and a lower edge;

positioning the upper edge of the music container against the upper retention member;

articulating the music container about the upper retention member until the music container engages the main support member between the lower support shelf and the upper retention member;

creating an interference fit of the music container between the lower support shelf and the upper retention member to hold the music container firmly on the visual display rack.

19. A method of placing a music container in an visual display rack according to claim 18, further comprising the steps of:

providing a retaining lip on the upper retention member;

inserting the upper edge of the music container into the retaining lip prior to the step of articulating the music container.

* * * * *